US009856876B2

(12) United States Patent
Pillis et al.

(10) Patent No.: US 9,856,876 B2
(45) Date of Patent: Jan. 2, 2018

(54) ROTARY SCREW COMPRESSORS UTILIZING VISCOUS DAMPING FOR VIBRATION REDUCTION

(71) Applicant: JOHNSON CONTROLS TECHNOLOGY COMPANY, Holland, MI (US)

(72) Inventors: Joseph W. Pillis, Hagerstown, MD (US); Holger Tychsen, Waynesboro, PA (US); Richard W. Armentrout, Delmont, PA (US)

(73) Assignee: Johnson Controls Technology Company, Milwaukee, WI (US)

( * ) Notice: Subject to any disclaimer, the term of this patent is extended or adjusted under 35 U.S.C. 154(b) by 57 days.

(21) Appl. No.: 14/820,634

(22) Filed: Aug. 7, 2015

(65) Prior Publication Data

US 2016/0040670 A1 Feb. 11, 2016

Related U.S. Application Data

(60) Provisional application No. 62/035,104, filed on Aug. 8, 2014.

(51) Int. Cl.
*F01C 1/16* (2006.01)
*F03C 2/00* (2006.01)
(Continued)

(52) U.S. Cl.
CPC .......... *F04C 29/0021* (2013.01); *F04C 18/16* (2013.01); *F04C 18/28* (2013.01);
(Continued)

(58) Field of Classification Search
CPC .. F04C 2/16; F04C 18/16; F04C 29/02; F04C 29/025; F04C 29/026; F04C 2240/50;
(Continued)

(56) References Cited

U.S. PATENT DOCUMENTS 4,553,855 A * 11/1985 De Choudhury ....... F16C 27/02
384/215
4,952,076 A * 8/1990 Wiley, III ............. F01D 25/164
384/535

(Continued)

OTHER PUBLICATIONS

Taiwanese Office Action for TW Application No. 104125804 dated Dec. 13, 2016; 5 Pages.
(Continued)

*Primary Examiner* — Theresa Trieu
(74) *Attorney, Agent, or Firm* — Fletcher Yoder, P.C.

(57) ABSTRACT

A screw compressor utilizing radial and axial or thrust bearings to maintain the position of the rotors radially and axially and utilizing a damping fluid to dampen rotor vibrations. The damping fluid may conveniently be provided in the form of lubricant that is already used in the compressor to seal the clearances between the rotors and between the rotors and the cylinder during compression. The damping fluid is included in a squeeze film damper, arranged in a parallel arrangement with the radial or thrust bearings, which provides viscous damping to the rotor. The introduction of additional viscous damping such as may be provided by squeeze film dampers may result in significant reduction of compressor vibration regardless of the source of vibration.

20 Claims, 17 Drawing Sheets

(51) Int. Cl.
*F03C 4/00* (2006.01)
*F04C 29/00* (2006.01)
*F04C 18/28* (2006.01)
*F04C 29/02* (2006.01)
*F04C 18/16* (2006.01)
*F16C 33/10* (2006.01)
*F16C 17/02* (2006.01)
*F16C 32/06* (2006.01)

(52) U.S. Cl.
CPC ........ *F04C 29/025* (2013.01); *F04C 2240/54* (2013.01); *F04C 2270/12* (2013.01); *F16C 17/026* (2013.01); *F16C 32/0644* (2013.01); *F16C 32/0659* (2013.01); *F16C 33/107* (2013.01)

(58) Field of Classification Search
CPC .............. F04C 2240/54; F04C 2240/56; F04C 2240/20; F04C 2240/60; F04C 29/0021; F04C 2270/12; F16C 17/026; F16C 17/04; F16C 17/10; F16C 17/104; F16C 33/107; F16C 32/0644; F16C 32/0659; F16C 32/0692; F16C 32/0696; F16C 32/0666
USPC ................ 384/100, 101, 114, 115, 118, 121; 418/201.1–201.3, DIG. 1, 88, 97–100
See application file for complete search history.

(56) References Cited

U.S. PATENT DOCUMENTS

| | | | |
|---|---|---|---|
| 5,469,713 A | 11/1995 | Wardle et al. | |
| 6,059,551 A * | 5/2000 | Amano | F04C 29/026 418/DIG. 1 |
| 6,302,667 B1 | 10/2001 | Timuska et al. | |
| 6,506,038 B2 * | 1/2003 | Sjoholm | F04C 18/16 418/201.1 |
| 2005/0018936 A1 * | 1/2005 | Yoshimura | F04C 18/16 418/201.1 |
| 2007/0086685 A1 | 4/2007 | Klusman et al. | |
| 2007/0163840 A1 | 7/2007 | Sekiya et al. | |
| 2011/0052109 A1 | 3/2011 | Tecza et al. | |
| 2011/0256008 A1 * | 10/2011 | Hattori | F04C 18/16 418/201.1 |
| 2012/0141056 A1 * | 6/2012 | Nicholas | F16C 27/10 384/125 |

OTHER PUBLICATIONS

A. Bouzidane & M. Thomas, "Equivalent Stiffness and Damping Investigation of a Hydrostatic Journal Bearing", Tribology Transactions, Society of Tribologists and Lubrication Engineers, 2007, pp. 257-267, Montreal, Canada.

* cited by examiner

ROTARY SCREW COMPRESSORS UTILIZING VISCOUS DAMPING FOR VIBRATION REDUCTION

FIELD OF THE INVENTION

The present invention is directed to rotary screw compressors employing bearings and a damping fluid for positioning and damping of the rotating screw, and more specifically, radial and axial bearings for accurate positioning of the rotating screws and a squeeze film damper to provide damping of vibrations in parallel with the anti-friction bearings.

BACKGROUND OF THE INVENTION

Rotary screw compressors are used to compress a wide variety of gases. These compressors are used for industrial refrigeration and for air conditioning. They are also used for air compression and for compressing gases such as natural gas. In these circumstances, the screw compressors may be located in remote locations and required to run for long periods of time, weeks or months, with minimal service. These compressors are also used to compress a wide variety of gases for other industrial applications.

Screw compressor may utilize two rotors on parallel axes, referred to as twin screw designs or may be single screw compressors or single screw designs. Twin screw designs employ two matched helical rotors, a male rotor and a female rotor, which turn together. A single screw design employs a single rotating helical rotor that usually meshes with gate rotors. In oil injected screw compressor types, the screw compressors operate with oil injection that seals the clearance between the rotors and between the rotors and the cylinder. The lubricant also helps cool the compressor. The lubricant, which is in contact with the refrigerant or gas, may absorb the refrigerant or gas when the lubricant used is miscible with the refrigerant or gas being compressed, which is frequently the case.

Large screw compressors have experienced problems with excessive vibration, particularly when driven at high drive power, in excess of 3000 horsepower, and high discharge pressures. This problem may be brought about as a result of rotor excitation near critical speeds. Forces imposed on the rotor are resisted by the use of radial and axial (thrust) bearings that position the rotors in the supporting housings. The existing bearing designs may not provide sufficient damping to avoid rotor excitation. These radial and axial bearings generally comprise two basic types: hydrodynamic bearings and anti-friction bearings. Hydrodynamic bearings, or oil film type bearings include sleeve or journal bearings. These bearings do not provide precise rotor positioning and result in higher frictional power consumption, which results in higher temperatures that can limit operations. These factors are exacerbated as the compressor size increases, limiting their usefulness in larger compressors. These bearings also require full time oil pumps to supply lubricant to the bearings. Anti-friction bearings such as ball bearings, cylindrical roller-type bearings or tapered roller bearings overcome these problems. They desirably provide precise rotor positioning. However, anti-friction bearings disadvantageously provide much lower relative damping coefficients than hydrodynamic bearings. In situations where vibratory motion of the rotors with respect to the housing occurs, anti-friction bearings provide very little relative damping of the motion. Damping is a force produced in the supporting or damping element that resists the relative motion of the rotors. The magnitude of the resisting force is proportional to the velocity of motion. Thus, as sizes of the screw compressors increase, and damping forces increase, the anti-friction bearings become less effective in damping vibrations. These vibrations may be amplified by resonance at critical frequencies that are excited by energy at a lobe-passing frequency or one of its harmonics. This can result in damage to not only the male and female rotors, but also to the rotor housing as the rotor bounces into contact with the housing as well as applying load to thrust bearings, all of which may result in damage to the compressor.

Squeeze film dampers are dampening devices that have been used to provide viscous damping in mechanical systems. These squeeze film dampers have been used in series with conventional bearings set forth above in rotating machinery such as jet engines. These squeeze film dampers provide structural isolation to reduce, for example, jet engine rotor response to imbalance. However, squeeze film dampers such as utilized in jet engines have not been utilized in screw compressors as the squeeze film dampers positioned in series with conventional bearings do not provide the needed accuracy for positioning the rotor in a screw compressor. The clearance in such systems is too great to accurately support screw rotors during operation.

What is needed is a damping mechanism for screw compressors that dampen rotor vibration so that resonance effects are limited at critical frequencies, while also providing precise rotor positioning within the housing and with respect to mating rotors.

SUMMARY OF THE INVENTION

A screw compressor utilizes radial and axial or thrust bearings to maintain the position of the rotors radially and axially and may also utilize a damping fluid to dampen rotor vibrations. There are many sources of vibration in a screw compressor. Excitations may come from rotor or coupling imbalance, shaft misalignment, gas pulsation from the discharge port opening or the injection of lubricant into the compression area as part of normal compressor operation. The damping fluid may be provided conveniently in the form of lubricant that is already used in the screw compressor to seal the clearances between the rotors and between the rotors and the housing during compression. The damping mechanism is conveniently included in a squeeze film damper, which provides viscous damping to the rotor. The introduction of additional viscous damping such as may be provided by squeeze film dampers may result in significant reduction of compressor vibration regardless of the source of vibration.

In the screw compressor, the squeeze film dampers are utilized in conjunction with an existing anti-friction bearing system and are used in parallel with the existing anti-friction bearings. The squeeze film dampers (SFD) are positioned between the bearings and the rotor shafts within the rotor housing. Because the SFDs are placed in parallel with the existing anti-friction bearings rather than in series, the clearances are not cumulative. The SFDs act as dampers while the existing anti-friction bearings operate to maintain the rotor in proper alignment.

Since the SFDs utilize lubricant already present in the screw compressor, the lubricant must be treated so that it is suitable for use as a damper. In normal operation, the lubricant in a screw compressor contacts refrigerant or other gas as it seals the clearances as discussed above and it also removes heat from the compressor. This lubricant also absorbs refrigerant or other gas in the oil separator where it is under discharge pressure level. So to be effective as a damping fluid, the lubricant must be injected into the dampers with sufficient sub-cooling below saturation pressure to avoid the formation of bubbles in the damper, which may be accomplished by providing at least one of a lubricant cooler or a lubricant pressurizer.

The system for damping vibrations in a screw compressor includes a rotor having a helical screw, a housing, the rotor having the helical screw mounted in the housing, the rotor having a shaft with a first axial end and a second axial end, radial bearings positioned on the rotor shaft near each end of the shaft, the radial bearings precisely positioning the rotor in the housing within a first predetermined clearance range, a squeeze film damper parallel to the radial bearings, that is, positioned adjacent to the radial bearings such that the radial bearings are within the housing and between the end of the shaft and the squeeze film damper, the film damper having a second predetermined clearance range greater than the first predetermined clearance range of the radial bearings, at least one thrust bearing mounted on the shaft of the rotor, the at least one thrust bearing counteracting axial forces on the rotor, a lubricant source, a conduit from the lubricant source to the squeeze film damper, and at least one of a cooler and a pressure pump between the lubricant source and the squeeze film damper, the lubricant provided from the lubricant source being either cooled or pressurized, or both, wherein the lubricant provided to the squeeze film damper imparts a viscous damping to the rotor, the lubricant occupying the second predetermined tolerance range within the squeeze film damper between the rotor shaft and a wall of the squeeze film damper.

The squeeze film damper comprises a main damper body, an oil/lubricant film substantially contained within the main damper body that provides damping between the main compressor housing and the main body of the damper, and a damper bearing that transfers radial vibratory motion of a rotating shaft to the non-rotating main damper body.

An advantage of this arrangement is that vibrations of the rotor are damped by the action of the oil/lubricant film in the SFD, with the vibration of the rotating rotor transferred to the non-rotating damper through the damper bearing. The lubricant occupying the volume of the second predetermined tolerance range between the rotor shaft and the wall of the squeeze film damper will dampen any vibration of the rotor shaft as it rotates, as lubricant is squeezed from one side of this volume to the other side of this volume through the close clearance of the damper oil film even as the rotor rotates and vibrates. Since the second predetermined tolerance range of the squeeze film damper is greater than the first predetermined tolerance range of the radial bearings, even when a vibration becomes sufficiently severe as to transmit the vibration without damping through the rotor and into the radial bearings without significant damping, a film of lubricant is still present between the wall of the SFD and the rotor so that the vibration is damped and not transmitted along the rotor at a critical excitation (resonance) frequency.

Another advantage of the present invention is that the lubricant is provided to the SFD either as a cooled lubricant or a pressurized lubricant so that bubbles formed by any gas dissolved in the lubricant are minimized or eliminated. The presence of bubbles in the lubricant can be detrimental, as any forces from the vibrating rotor can form or create bubbles and reduce the effectiveness of the lubricant as a damping mechanism.

Another advantage of the present invention is that the viscous damping contribution of the SFDs is proportional to the vibrating velocity of the shaft, so that as vibration amplitude of the shaft increases, the effect of the viscous damping by the SFDs also increases. The addition of damping to the spring/mass system of the rotor and its bearings and supports significantly reduces the resonant response of the rotor and reduces any vibration associated with excitation of resonant frequencies in the system. The viscous damping effect of the SFDs assists in damping lateral natural frequencies. Although SFDs may be effective on all screw compressors, they are most effective in damping natural frequencies in large compressors, that is, having rotor diameters 355 mm and larger, in which damping of resonances is difficult by other means.

A further advantage of SFDs in large screw compressors with anti-friction bearings is a significant improvement in the application range of such compressors in increased operating pressures. In addition, the SFDs used in conjunction with anti-friction bearings provide a damping advantage previously associated only with hydrodynamic bearings, while also providing ease of service and improved tolerance and clearance ranges.

A further advantage of the application of SFDs in screw compressors is realized in variable speed applications. Many screw compressors are applied today with variable speed drive as a means of capacity control. However, changing the speed over large ranges means that the excitation frequencies of rotational speed, lobe passing, and harmonics of lobe passing will provide potential excitation over a very wide range of speed-dependent frequencies. SFDs reduce the rotor's reaction to this excitation at any frequencies that might be near any critical mode of vibration of the rotor or rotors in multiple rotor compressors so that rotor operation can be more independent of speed. This reduces rotor vibration at those speeds and corresponding frequencies that would otherwise have to be avoided by skipping the speeds and corresponding frequencies of operation at which excessive rotor vibration occurs.

A further advantage is that SFDs may allow an increase in the maximum discharge pressure of the screw compressor, and/or the input power. For a screw compressor, many other characteristics other than vibration limits control discharge pressure and power, including but not limited to housing maximum operating pressure, bearing life, drive shaft strength and rotor deflection. In cases where vibration becomes the limiting factor, it would be possible for a large compressor, that is a compressor having rotor diameter of 355 mm, the discharge pressure and power output may be increased by up to 100% above levels achievable without damping, without exciting rotor natural frequencies that might occur at the higher pressures without damping. The increase in discharge pressure may depend on other factors and will vary with rotor diameter. Increases in discharge level typically may be in the range of 5-50%, 10-25% or 5-15% depending on those factors.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
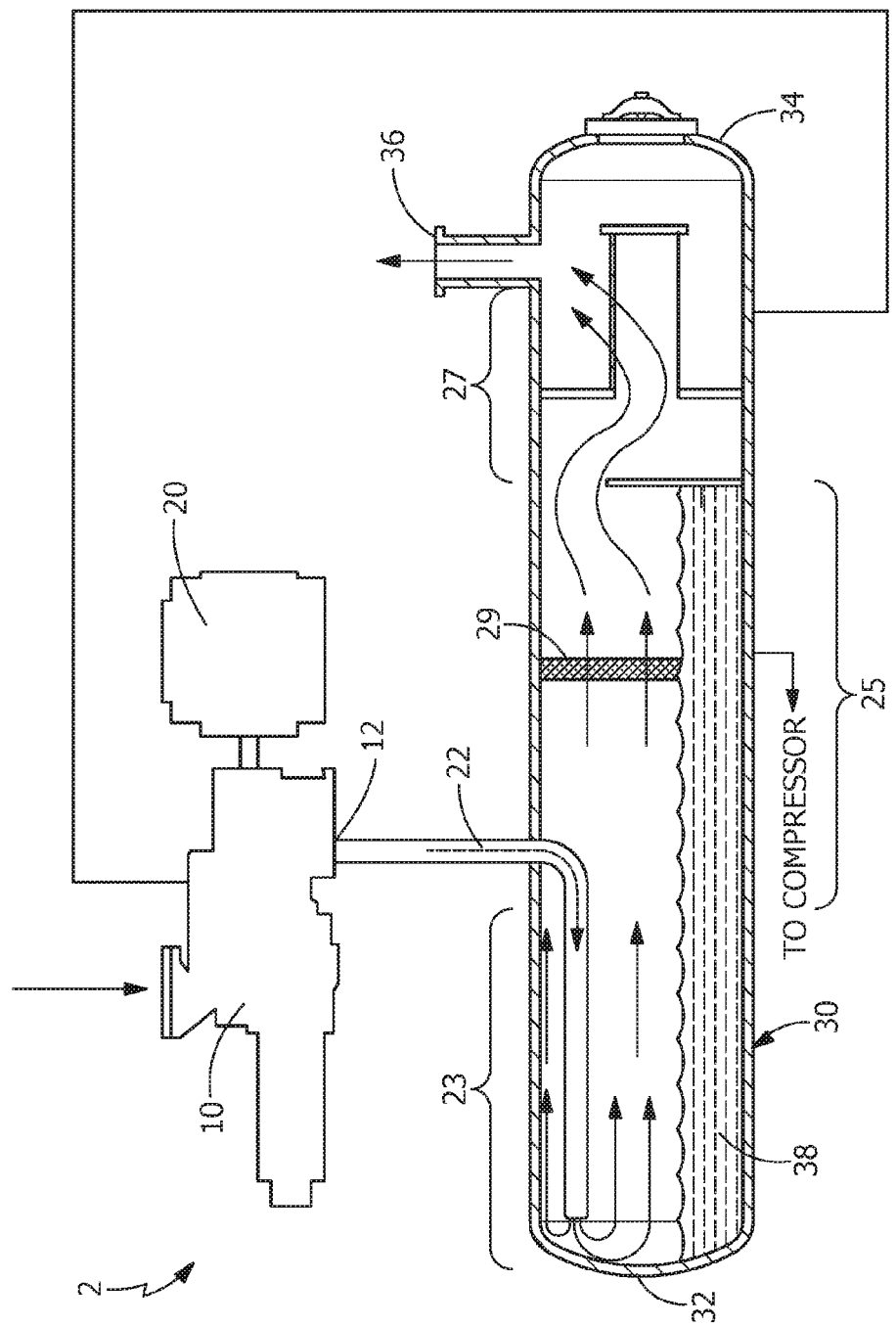
FIG. 1 is a cross section of a prior art screw compressor assembly.

FIG. 1 depicts a prior art screw compressor assembly 2 shown in cross section. The assembly comprises a screw compressor 10, a motor 20 that drives screw compressor 10 and an oil separator 30. Compressed refrigerant and lubricant from compressor 10 is discharged from the discharge port 12 of screw compressor 10 through conduit 22 into oil separator 30 where compressed refrigerant gas is separated from lubricant, compressed refrigerant gas being discharged through separator discharge port 36 while lubricant 38 is coalesced and allowed to settle for recycling to compressor 10.

Figure 2:
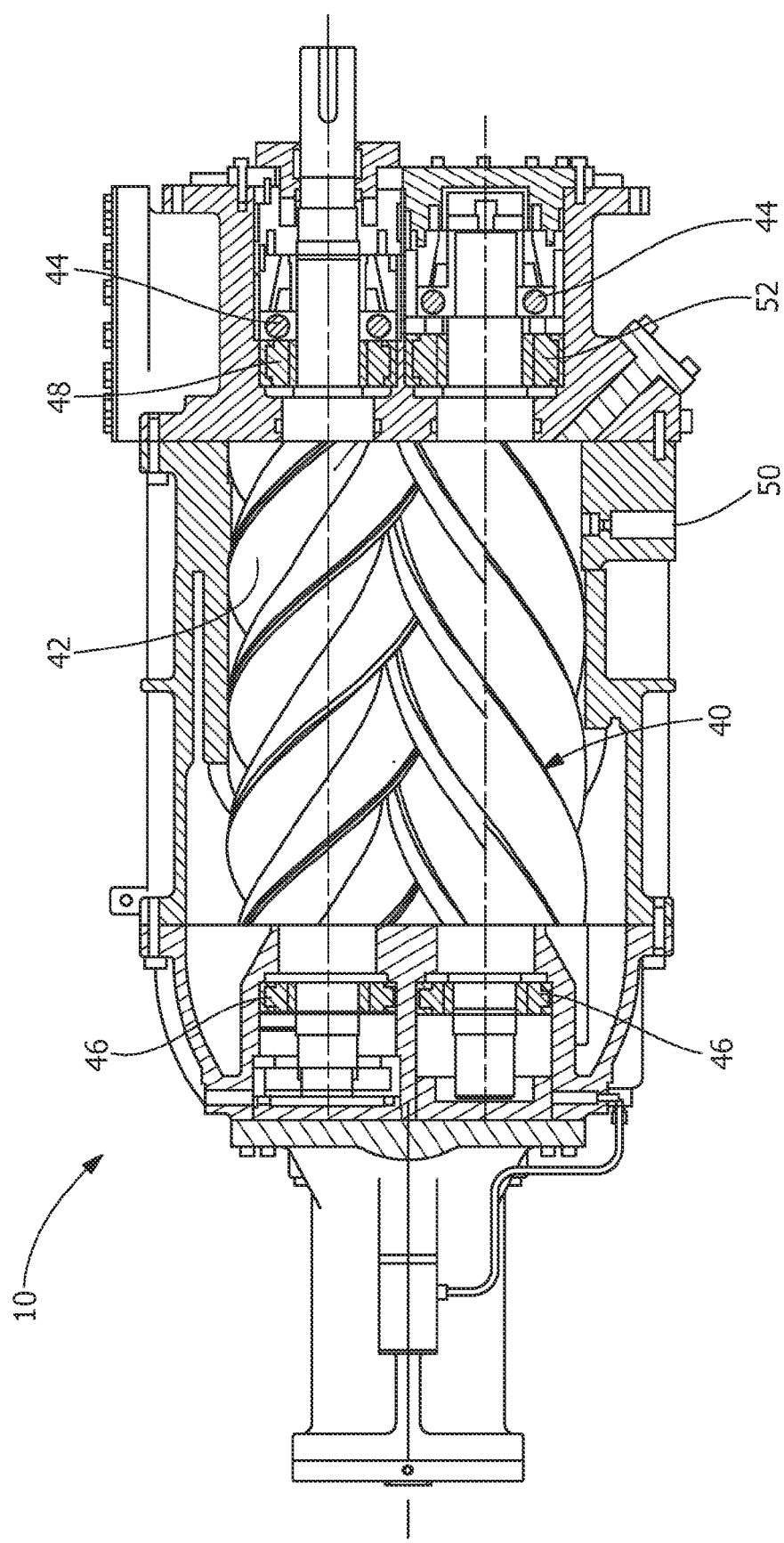
FIG. 2 depicts a partial cross-section of a twin screw compressor such as may be included in the screw compressor assembly of FIG. 1.

FIG. 2 is a partial cross section of screw compressor 10 of FIG. 1, depicting a twin screw compressor. While a twin screw compressor is depicted in FIG. 2, one skilled in the art will recognize that screw compressor 10 may also be a single screw compressor or a tri-screw compressor. These compressor designs are subject to vibration, so the vibration damper of the present invention is adaptable to any of these screw compressor configurations. As is evident from the drawings and recognized to those skilled in the art, in order for the screw compressor to be effective, the fit-up between the parts is critical and the tolerances are tight. Any vibrations in excess of the tolerances can result in damage to the screw portion of rotors, one or more of the bearings and/or the compressor housing, any one of which could lead to compressor shut down.

In the cross sectional view of FIG. 2, the twin screw rotors 40, 42 are supported at both ends of their shafts by radial bearings 52, 48 46. The radial bearings may be any type of anti-friction bearing such as cylindrical roller bearing, tapered roller bearings or ball bearings. In addition, anti-friction bearings may be substituted for lubricant film-type bearings and vice versa. The anti-friction bearings advantageously provide certain advantages over hydrodynamic, oil film-type bearings in that they provide more precise rotor positioning, which is an important consideration for screw compressors. In addition, they are more efficient as they lose less power to frictional power consumption. They have a longer life than hydrodynamic bearings when there is an interruption or loss of oil supply, generally not requiring the use of full time lubricant pumps to provide lubricant, and can operate effectively at higher temperatures than sleeve-type hydrodynamic bearings. Anti-friction bearings have a disadvantage of a lower relative damping coefficient than hydrodynamic bearings, which is a disadvantage when vibration is a problem, which sometimes occurs in screw compressors. Also shown in FIG. 2 is conduit 50, providing lubricant from oil separator to lubricate and seal the clearance between the rotors as refrigerant is compressed during operation. A thrust bearing 44 is also depicted associated with the shaft of the rotor or screw for resisting axial forces. As noted previously, thrust bearings may be hydrodynamic or anti-friction bearings.

Figure 3B:
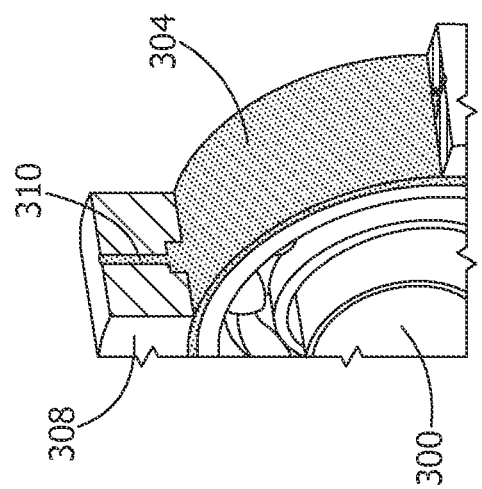
FIG. 3b is a partial perspective view of a squeeze film damper with the outer housing shown in cross-section, showing a lubricant inlet extending through an outer housing.
Figure 3C:
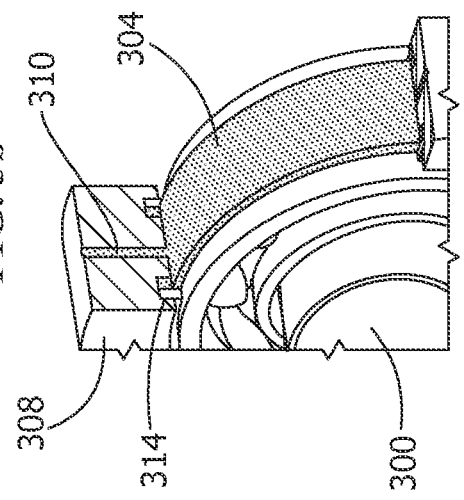
FIG. 3c is a partial perspective view of a squeeze film damper with the outer housing shown in cross-section, similar to that of FIG. 3b, showing a seal which assists in maintaining the lubricant within a volume.
Figure 3A:
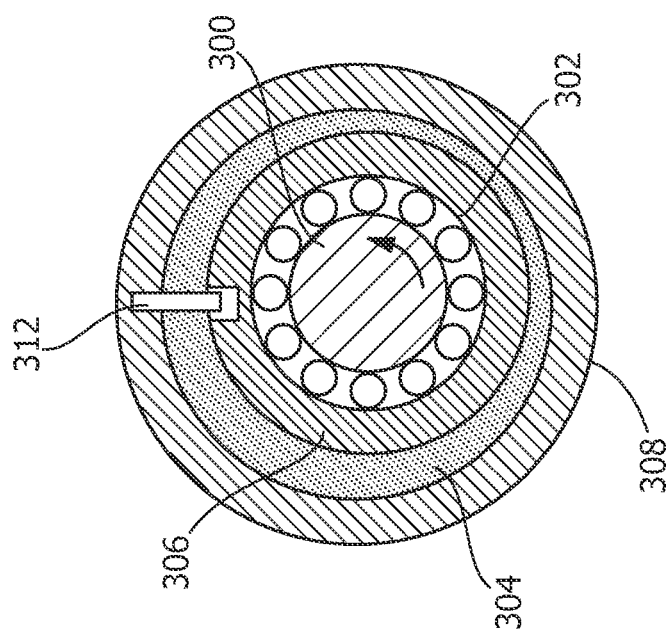
FIG. 3a is a cross-sectional view of a squeeze film damper positioned in series with a roller bearing.

The present invention utilizes, in a screw compressor, a damping device in parallel with the shaft bearings to provide damping for screw compressor vibrations in order to avoid damage to the screw compressor. The damping device may be used with any of the shaft bearings, but preferably are used with anti-friction bearings as the damping device provides much better damping capabilities than is inherent in the anti-friction bearings without dampers, while retaining the precision in shaft alignment provided by the anti-friction bearings. To understand the difference between a damping device in parallel with shaft bearings as used herein, reference is made to FIG. 3, which depicts a damping device, a squeeze film damper (SFD) mounted in series with a shaft bearing, such as ball bearing depicted in cross section in FIG. 3a. As can be seen, a rotor or shaft 300 of a screw compressor is mounted within an anti-friction bearing, such as ball bearing 302. Ball bearing in turn is mounted within SFD 304. SFD 304 includes a journal 306, an outer housing 308, and a lubricant fed to the volume between the outer housing 308 and journal 306. An anti-rotation pin 312 locks bearing journal 306 to outer housing 308 to prevent relative rotation of journal 306 with respect to outer housing 308. Lubricant is fed into the volume by lubricant inlet 310, FIGS. 3b and 3c, which maintains a film of lubricant within the volume. As the shaft 300 and bearing 302 rotate, the bearing transfers any vibratory radial motion from the rotating shaft to the journal 306. Radial motion of journal 306 causes lubricant 304 to be squeezed within the volume between outer housing 308 and journal 306. Seal 314, FIG. 3c, assists in maintaining the lubricant within this volume. The lubricant will act to dampen any excess vibration of shaft 300; however, the tolerances or clearances between shaft 300, ball bearing 302, the shaft/bearing combination and the SFD stack up, that is, accumulate. Thus, the position of screw shaft 300 can vary not only by the clearance between shaft 300 and ball bearing 302, but additionally by the clearance or tolerance between the shaft/ball bearing assembly and the SFD. This stack-up is not desirable in a screw compressor, as it increases the radial distance that the shaft can move when subject to vibration. While this may reduce bearing damage potential, this movement under severe vibration may still result in damage to the rotor. While radial bearing operation and design is depicted and described above, one skilled in the art will recognize, due to the helical design of screw 300, tolerance stack-up by a similar series arrangement for a thrust bearing may also result in damage to a screw when displaced axially.

Figure 4:
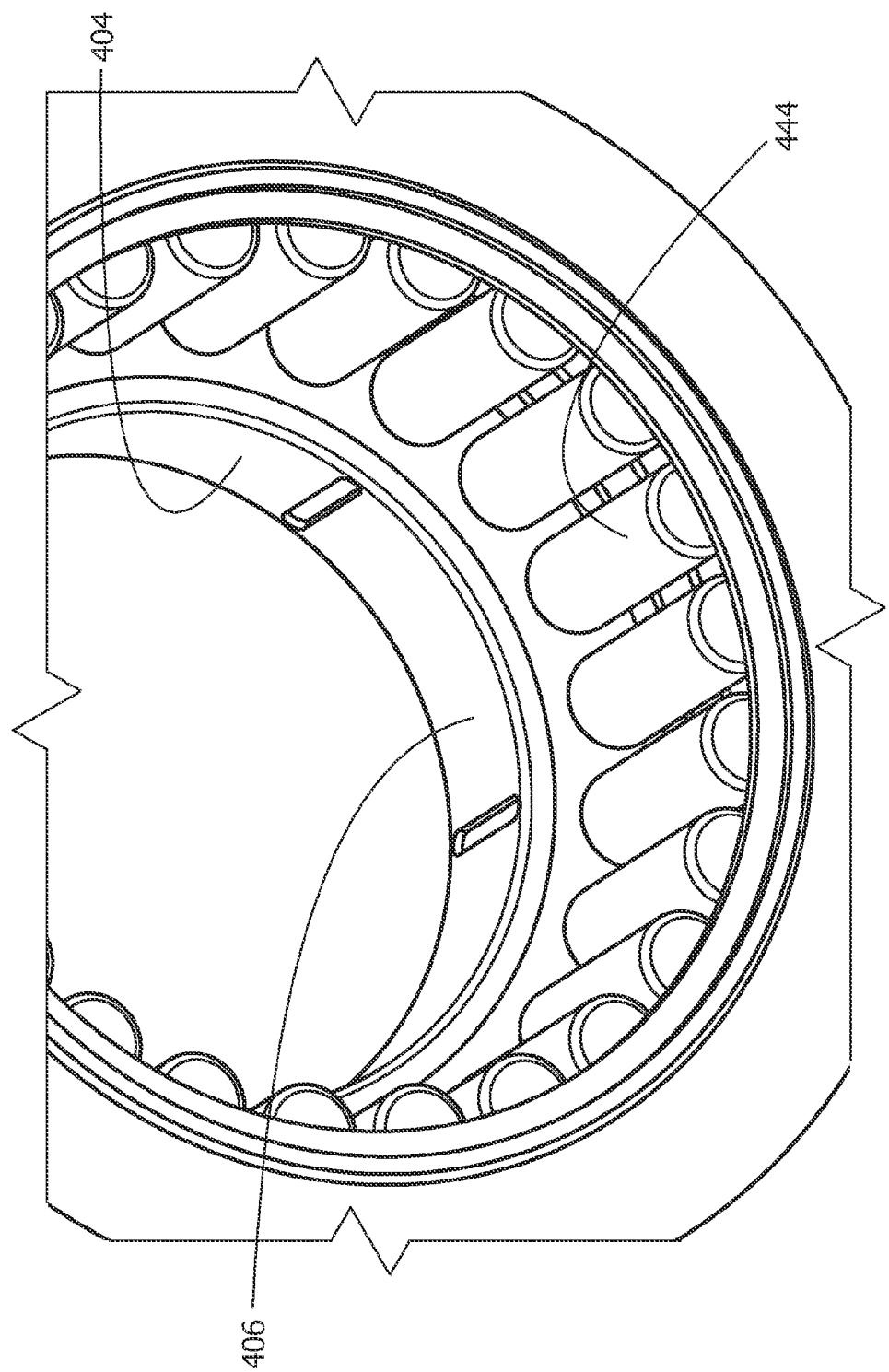
FIG. 4 is an end view depiction of a squeeze film damper positioned in parallel with a cylindrical roller bearing in a screw compressor housing, with the rotor removed, in accordance with the present invention.

FIG. 4 depicts a damping device of the present invention arranged in parallel with an anti-friction bearing, without the compressor screw depicted to better illustrate the invention. In FIG. 4, an anti-friction radial bearing, for example a cylindrical roller bearing 444 as shown, is positioned in parallel, that is, axially adjacent to, a SFD 404. The damper bearing journal 406 of SFD 404 as depicted is visible. The inner diameter of the SFD 404 is slightly larger than the inner diameter of cylindrical roller bearing 444 to facilitate assembly and disassembly. The clearance between the rotor shaft, not shown in FIG. 4, and SFD 404 is slightly greater than the clearance between rotor shaft and cylindrical bearing 444. A thin film of lubricant is provided in SFD 404 to damp vibrations of the shaft, which guarantees that under the most severe vibrations in which the rotor shaft may vibrate within roller bearing and against roller bearing 444, a thin film of lubricant remains between the rotor housing and journal 406 to provide damping of these vibrations so as to prevent damage to the rotor between the bearings as the clearance between the housing and the other rotor or screw of the screw compressor is reduced or eliminated by the vibration. Damping minimizes the loss of clearance resulting from the vibration i.e. periodic radial screw movement. The damping by SFD 404 also reduces the amplitude of forces associated with the vibrations acting at or against the bearings which may otherwise cause bearing damage. For example, if the SFD 404 has a clearance of 0.010 inches (10 mils), and bearing 444 has a clearance of 0.005 inches (5 mils), then SFD 404 has a clearance that is 5 mils larger than bearing 444. Thus, under severe vibrations, when the rotor shaft vibrates, there is still radially a minimum of 0.0025 (2.5 mils) clearance in the SFD occupied by oil/lubricant film that provides damping to dampen any vibrations experienced by the shaft. Even as the rotor shaft of the screw compressor moves into this clearance, the lubricant in the journal prevents the rotor shaft from moving through the entire 2.5 mils of clearance while damping the periodic motion, that is, vibration, of the screw, reducing its effect on bearing 444, as well as the adjacent housing or screw. This allows the rotor to run with less absolute displacement. These exemplary numbers are not limiting, as the clearance provided will vary with the size of the rotor in the compressor. Thus, in this case, the clearance of the SFD with the rotor is 50% greater than the clearance of the radial bearing with the rotor. However, the clearance should be sufficient to dampen the periodic vibration of the rotor while preventing damage to the bearing, and the SFD may have a clearance that is 5% up to 50% greater than that of the radial bearing as long as damping of the periodic vibration of the rotor is accomplished without damaging the bearings. The damping effect of the SFDs allows the clearance tolerances to be made smaller on the rotors. Reduced clearances in turn mean less gas leakage between the threads, resulting in less leakage back to the suction side. The result is higher performance and efficiency. SFDs could result in an increase in adiabatic efficiency of up to 5%.

Figure 5:
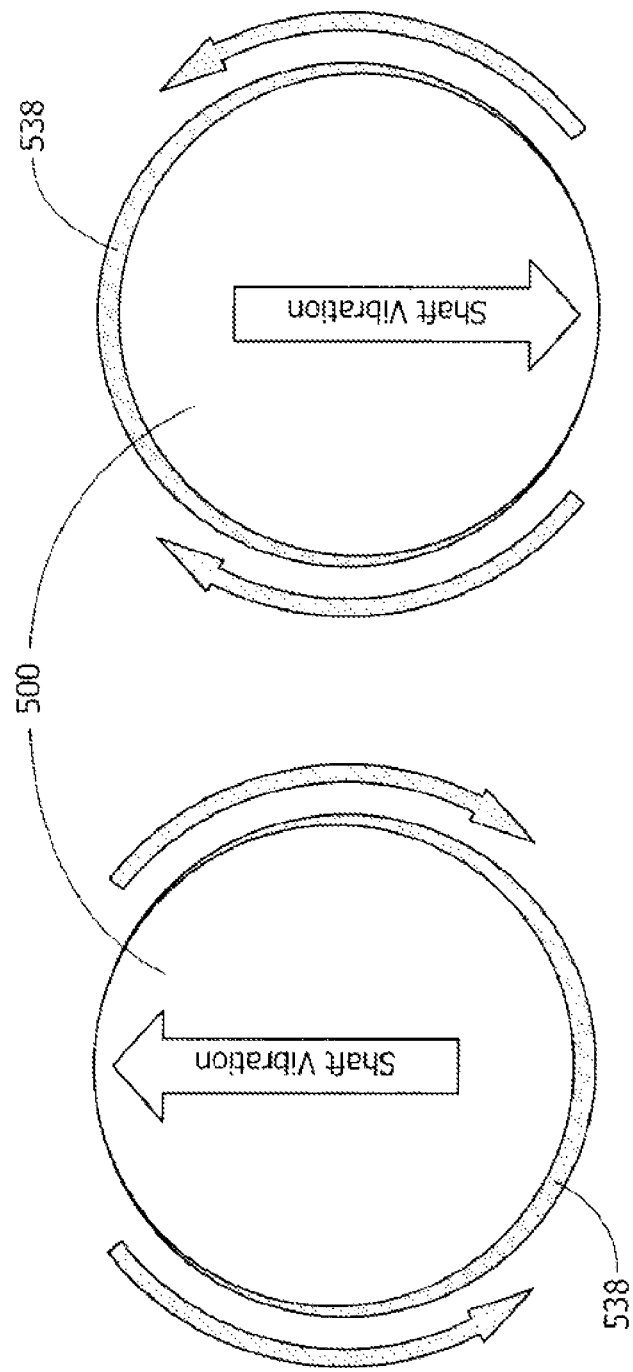
FIG. 5a is a diagram showing the positioning of the lubricant on one side of the damper in a squeeze film damper as the damper reacts to a vibration as lubricant squeezes through the close clearances of the SFD resulting in viscous damping.
FIG. 5b on the other side shows a seal provided in communication with the outer housing.

FIGS. 5a and 5b further illustrates the concept for the shaft of one rotor interacting with a SFD. FIGS. 5a and 5b area cross section of a rotor shaft in a SFD. As rotor shaft 500 rotates, it may exhibit a vibration in the direction depicted by the vertical lines, although the vibration may occur in any direction. Under normal conditions, a uniform volume of lubricant surrounds the shaft. As the shaft both rotates and vibrates, the lubricant 538 in the damper clearance is squeezed from one side of SFD to the other. The lubricant both cushions and dampens the vibration. Damping is an opposing force produced by a supporting or damping element that resists relative motion of a structure, here the rotor or screw, and the magnitude of the resisting force provided by the damping element is proportional to the velocity of the motion of the structure, here the rotor or screw moving in the direction of the arrows in FIGS. 5a and 5b. As used herein, rotor, shaft or screw all refer to the same rotating structure in a screw compressor.

Figure 6:
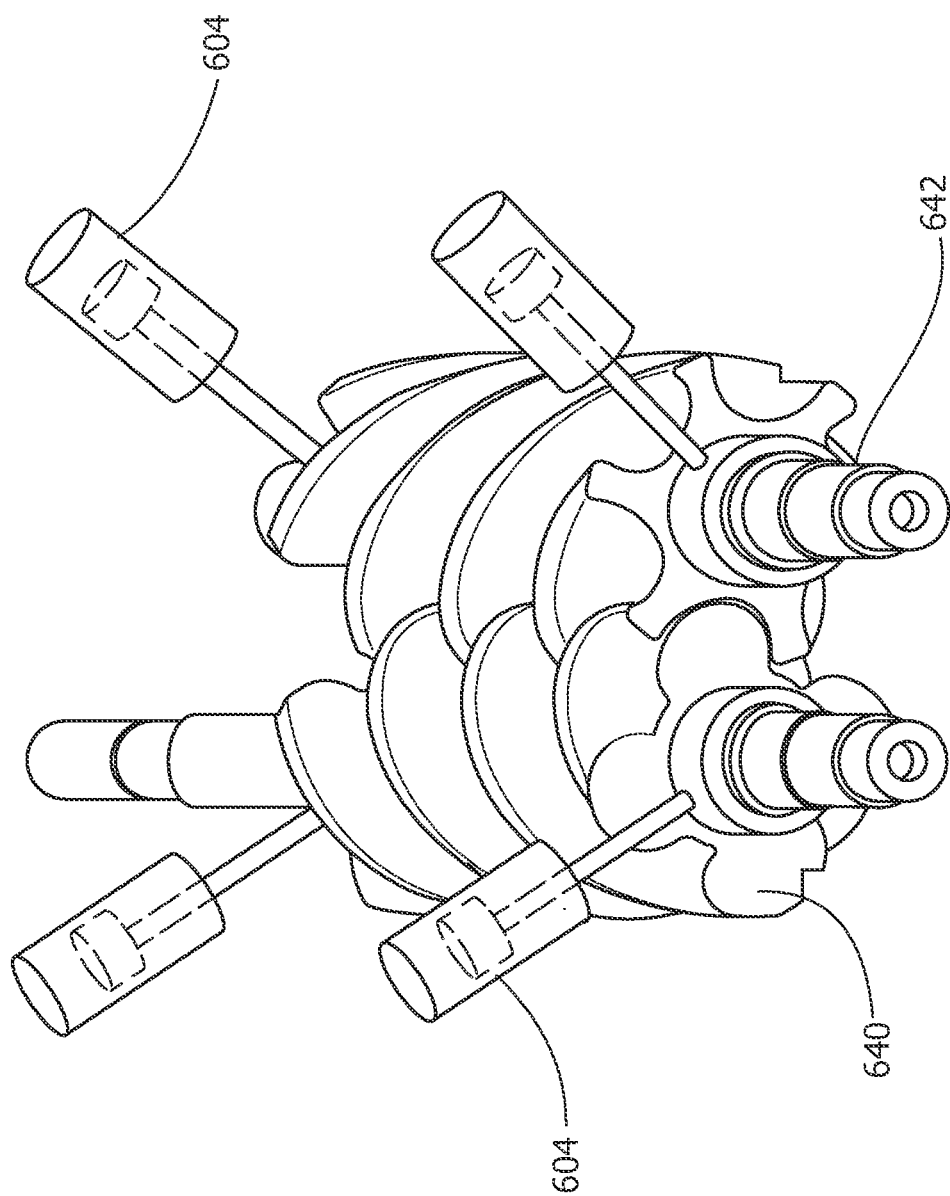
FIG. 6 depicts the equivalent damping effects of the squeeze film dampers produced on the male and female rotors by the application of SFDs at the diameter nearest the rotor body in the present invention.

FIG. 6 illustrates the damping effect provided by the SFDs 604. SFDs 604 act as shock absorbers. In FIG. 6, the SFDs 604 act as shock absorbers on each rotor 640, 642 in a twin screw system producing a resisting force to any rotor vibration in any direction. The SFDs 604 are not bearings, such as the previously described hydrodynamic bearings, as they do not support a load. They only provide damping of vibrations causing motion in the radial direction. It will be understood that SFDs also can be provided in a parallel arrangement for thrust bearings to dampen vibrations causing motion in an axial direction.

Figure 7:
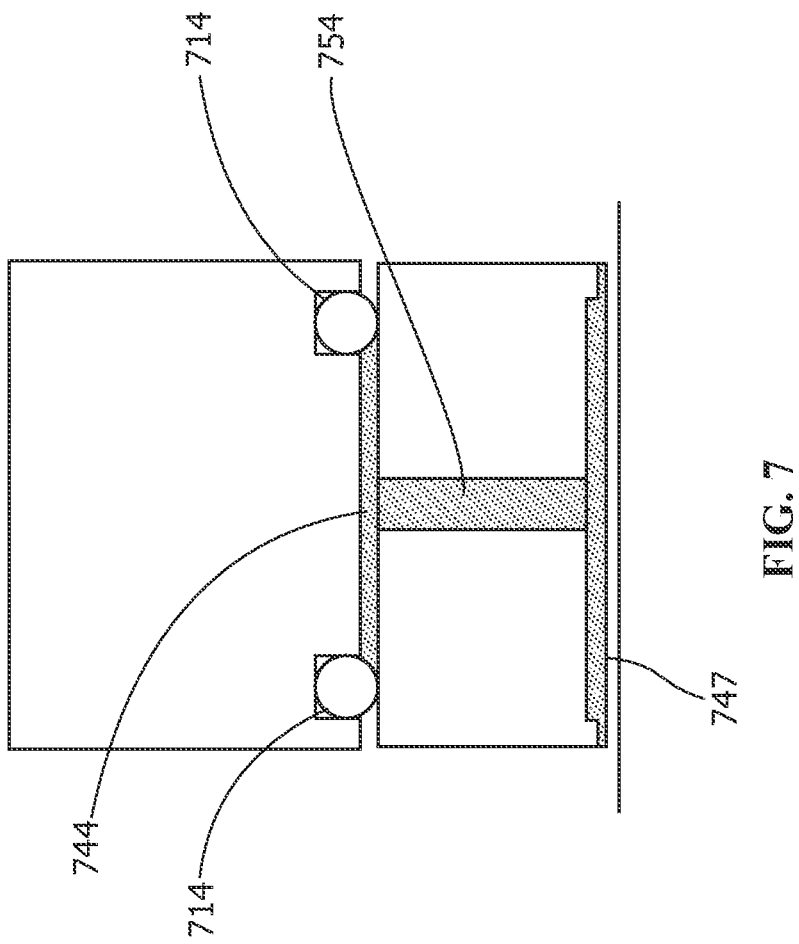
FIG. 7 is a cross-sectional view of the squeeze film damper concept of the present invention in relation to the rotor shaft.
Figure 8:
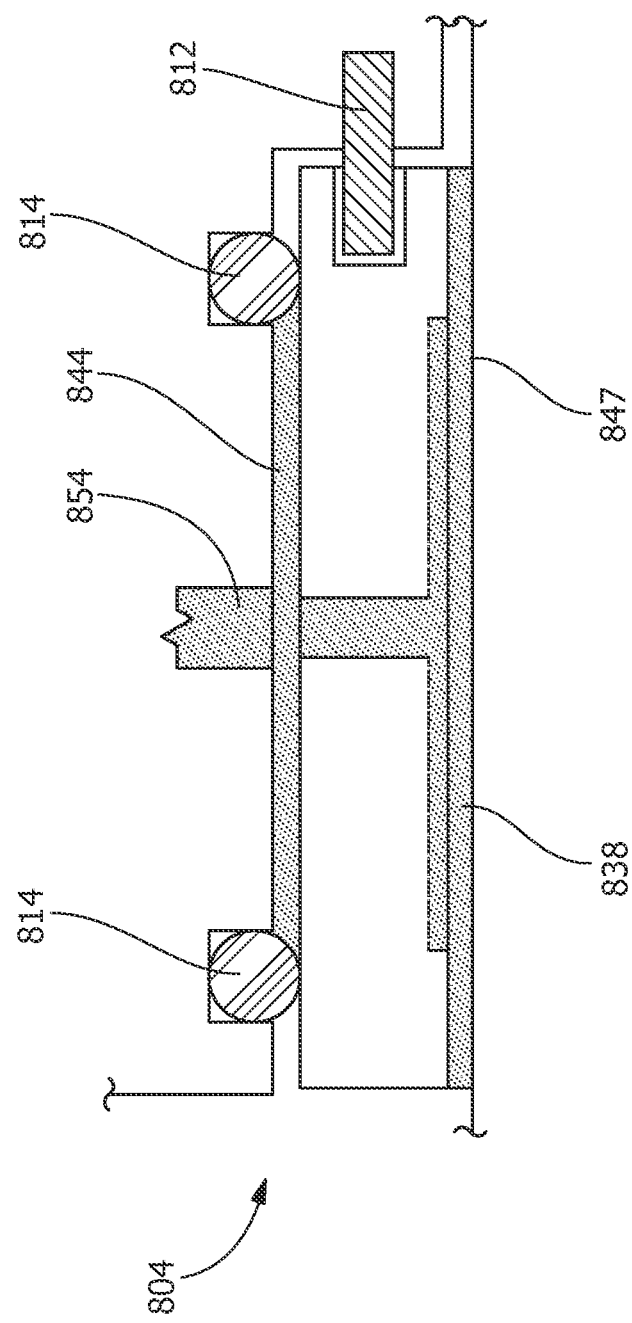
FIG. 8 is a partial cross-sectional view of the squeeze film damper concept of FIG. 7.
Figure 9:
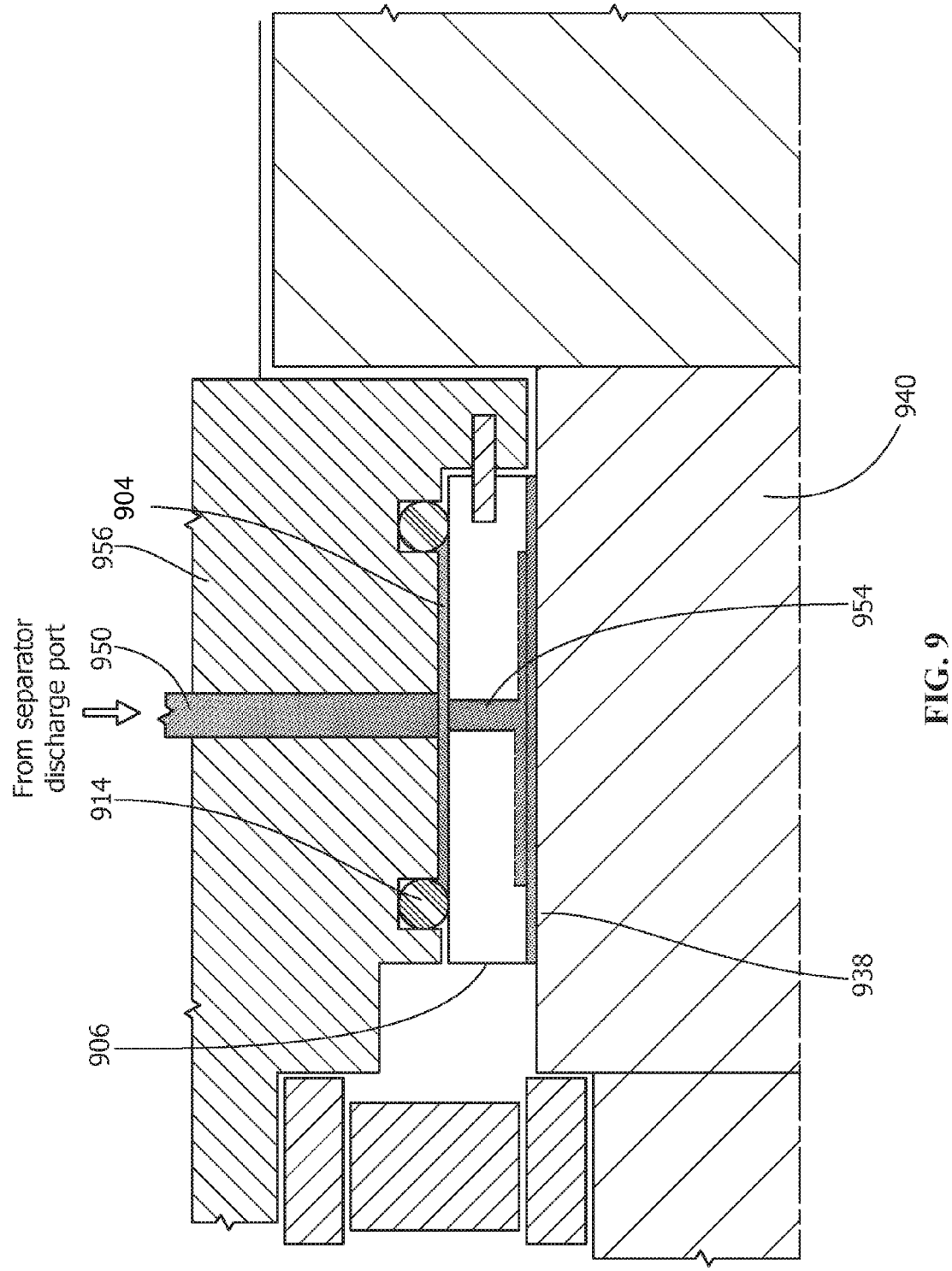
FIG. 9 is cross-sectional view of the squeeze film damper concept of FIG. 7 installed in a screw compressor housing adjacent a radial roller bearing.

FIGS. 7, 8 and 9 further illustrate the SFD concept. FIG. 7 discloses a cross section of a SFD illustrating key features in relation to the position of the rotor shaft. Illustrated in FIG. 7 is one of the lubricant supply ports 754 as well as squeeze film 744 on either side of supply port 754, damper bearing 747, seals 714. FIG. 8 also illustrates an embodiment of SFD 804 in cross section showing seals 814, lubricant supply port 854, squeeze film oil/lubricant 838. 844 on either side of supply port, damper bearing 847 and anti-rotation pin 812. FIG. 9 shows a SFD 904 in relation to a radial roller bearing 934, lubricant conduit 950 extending through compressor housing 956, in communication with the oil separator discharge port (not shown) and with supply port 954, and one of the rotors 940, supply port 954 providing squeeze film lubricant 938, 944 on either side of supply port 954 to the journal of SFD 904 and damper bearing 947.

Figure 10:
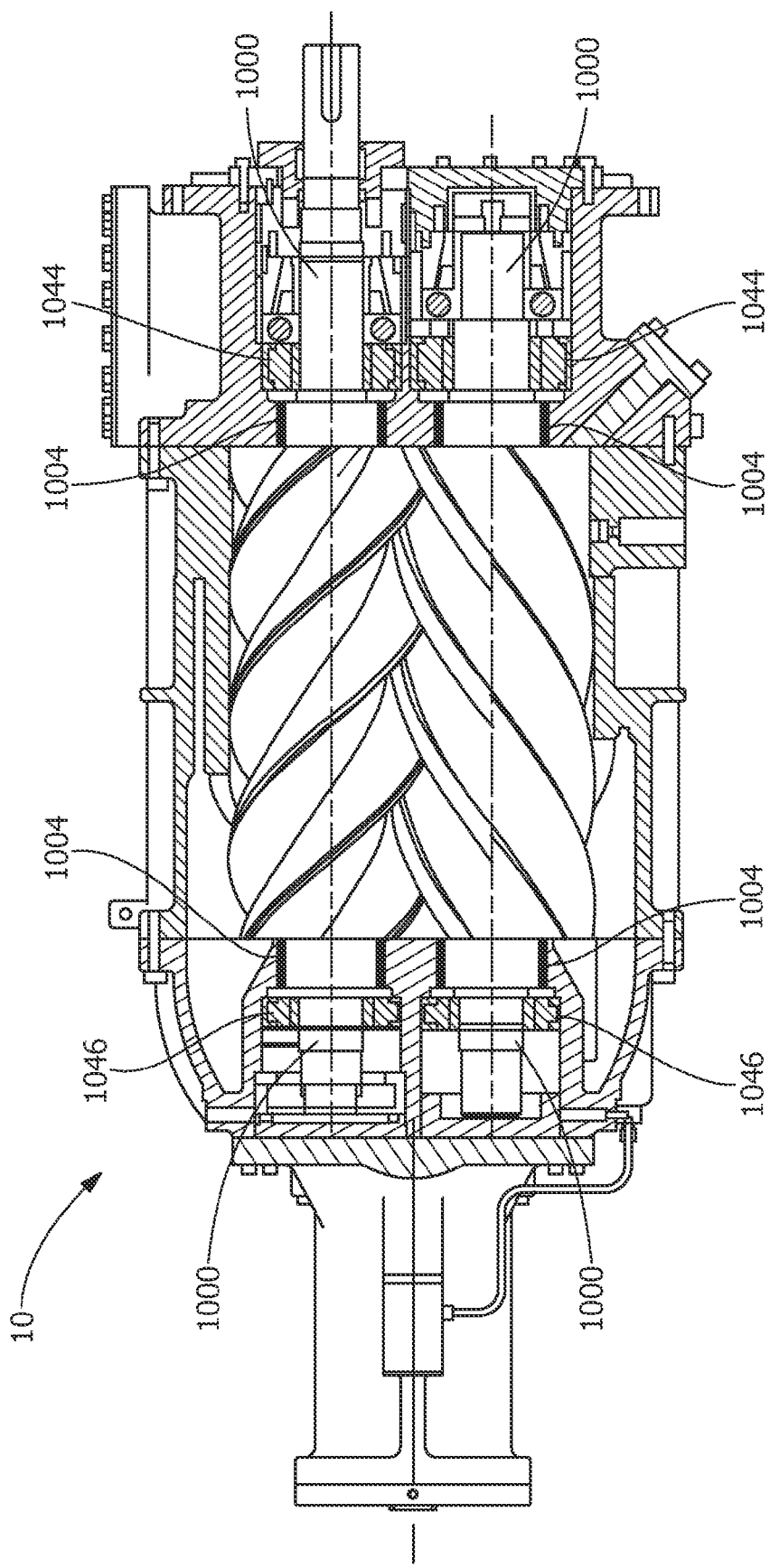
FIG. 10 depicts a cross-sectional view of one location of a set of four squeeze film dampers installed in the screw compressor of FIG. 2.

FIG. 10 depicts a set of SFDs 1004 installed adjacent to radial bearings in a screw compressor housing, such as the screw compressor housing set forth in FIG. 2. In this embodiment, the radial bearings, such as roller bearings 1044, 1046 are installed between the end of rotor shaft 1000 and SFDs 1004.

Figure 11:
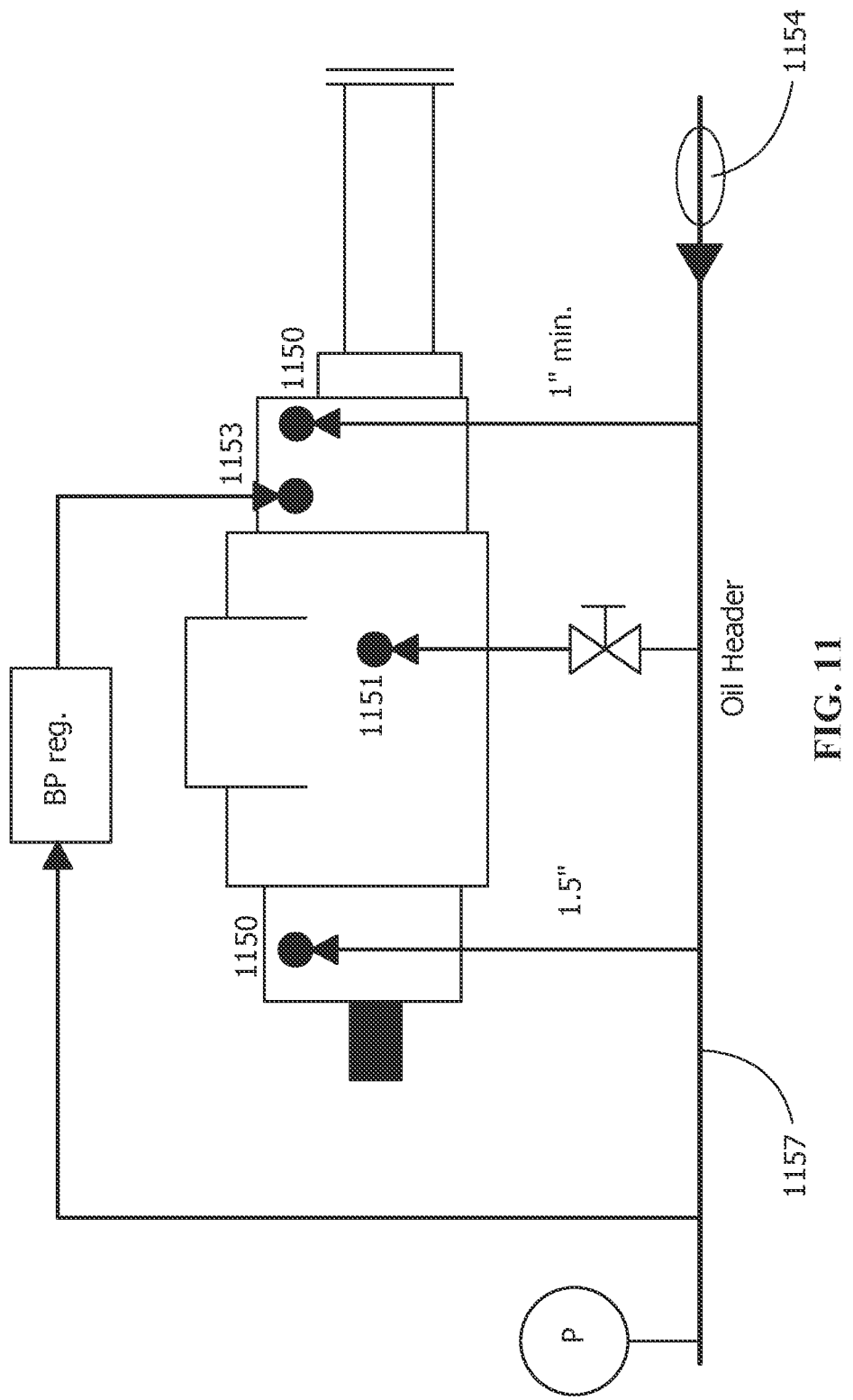
FIG. 11 is a diagrammatic sketch depicting lubricant connections to a screw compressor, including the squeeze film damper connections and a pump P used to raise the pressure of the lubricant supplied to the squeeze film damper.
Figure 12:
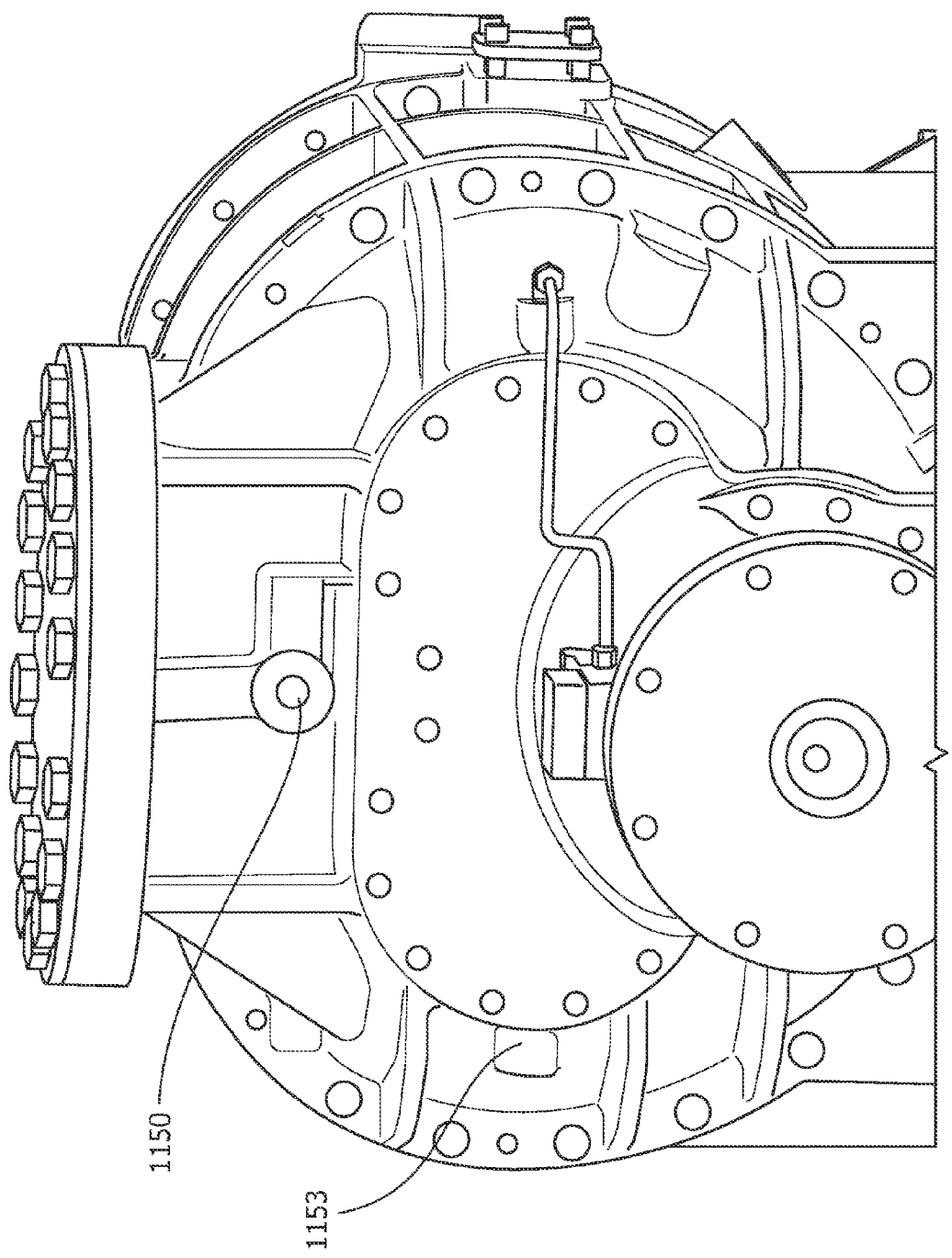
FIG. 12 is an end view of a screw compressor depicting a squeeze film damper connection.

FIG. 11 depicts an arrangement for providing lubricant flow to the screw compressor 10. Oil supply header 1157 provides oil from the oil separator and oil pump 1154, when provided. Main input 1151 for lubricant flow for the screws provides lubricant for normal operation of the compressor for sealing the volume between the screws. Oil/lubricant inlets 1150 provide lubricant for the SFDs. Oil/lubricant inlet 1153 provides lubricant for other components requiring lubrication in the screw compressor. FIG. 12 depicts the screw compressor housing from one end showing oil/lubricant inlets 1153 and 1150.

The lubricant supplied to the bearings, such as radial and thrust bearings, will contact the gas or refrigerant during compressor operation, and miscible lubricants may absorb the gas or refrigerant. During operation of the compressor, gas or refrigerant dissolved in lubricant can lead to foaming as the gas or refrigerant forms bubbles as a result of pressure drop of the lubricant being fed to the compressor. Oil separator 30 separates lubricant from refrigerant and minimizes foaming Of course, while foaming is not a desirable property in lubricant, it is not tolerable in SFDs since the lubricant performs a damping function, acting as a damper. The presence of bubbles interferes with the damping function because the bubbles collapse readily when subjected to forces from even minor vibrations. So, to be effective as a damper, the lubricant supplied to the SFDs must be treated to reduce the tendency for bubble formation.

Figure 13:
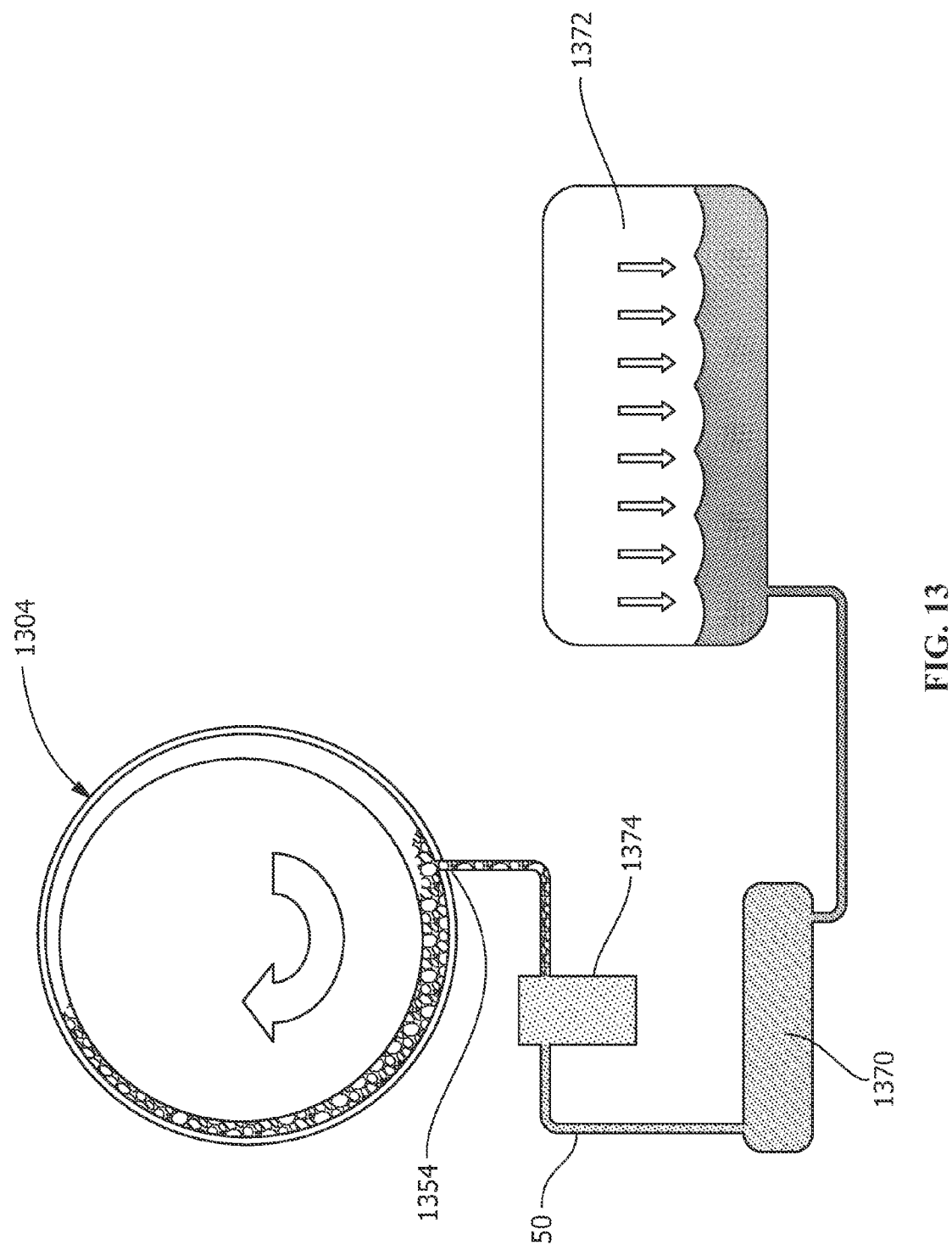
FIG. 13 depicts a squeeze film damper circuit that includes a lubricant cooler to cool the lubricant before it is supplied to the squeeze film damper.
Figure 14:
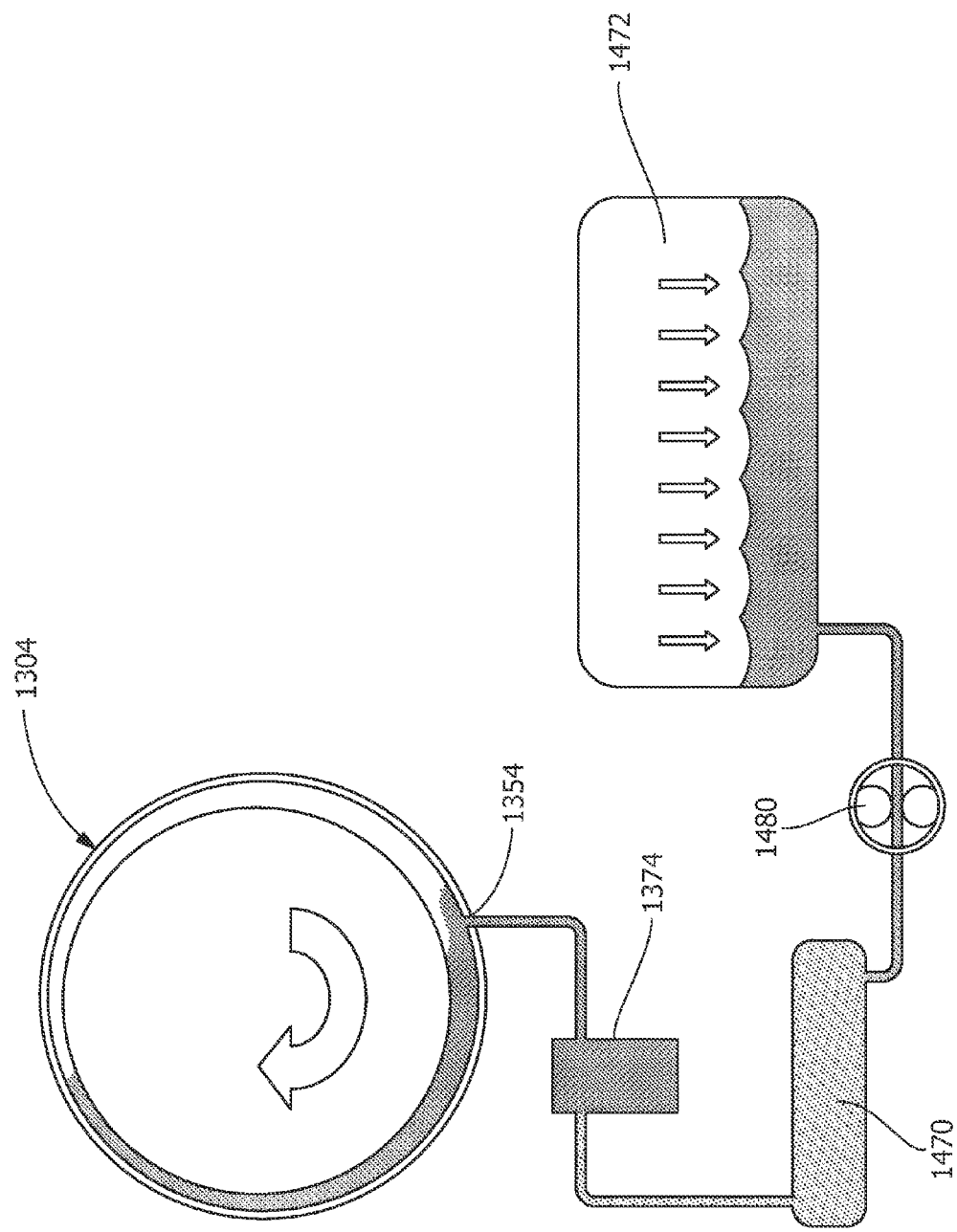
FIG. 14 depicts a squeeze film damper circuit that includes a lubricant cooler to cool the lubricant and a lubricant pump to raise the pressure of the lubricant before it is supplied to the squeeze film damper.
Figure 15:
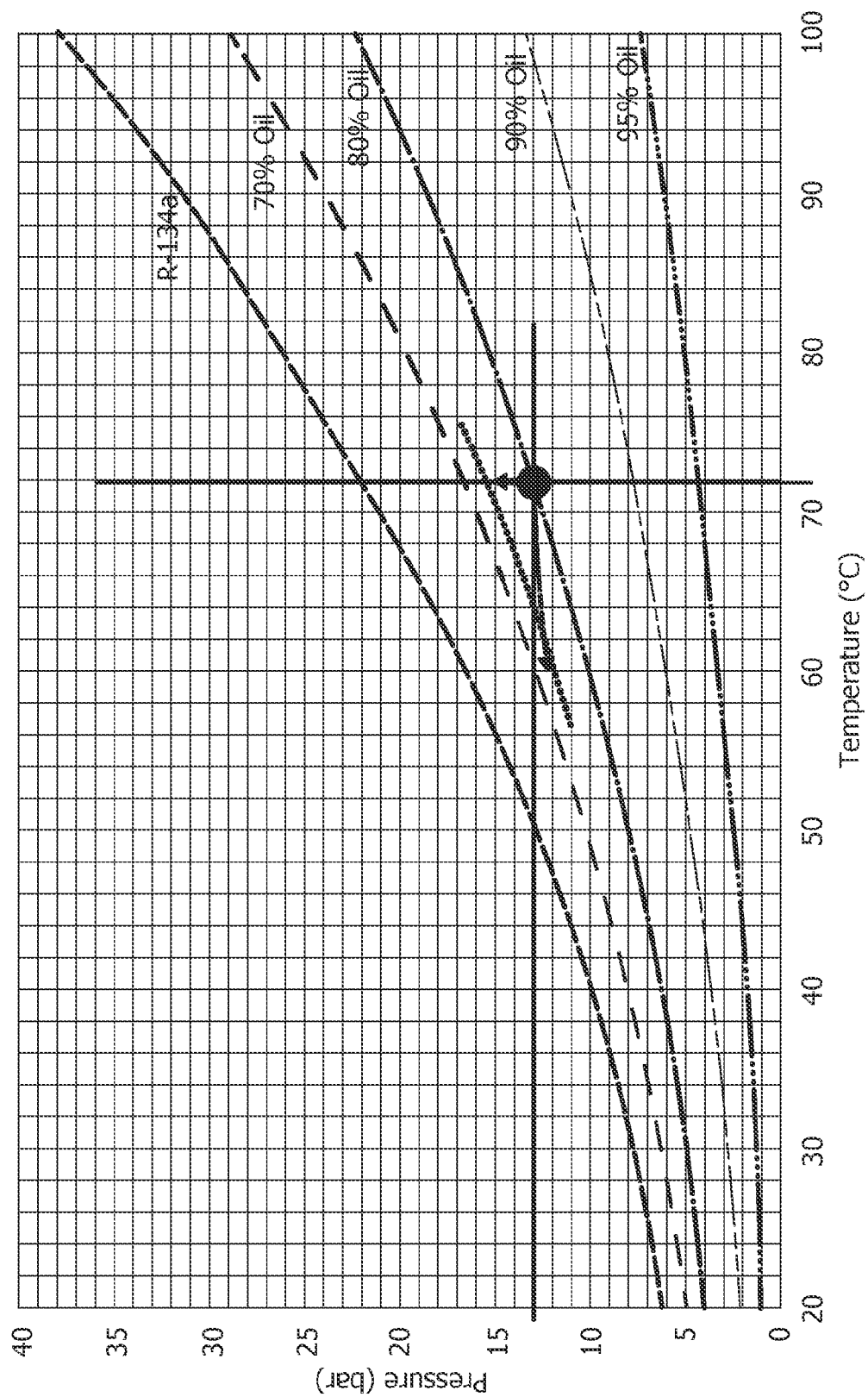
FIG. 15 is a graph depicting the effect of temperature and pressure on bubble formation at various levels of refrigeration absorption in a system of Frick #13 lubricant and R-134a refrigerant.

Reference is now made to FIGS. 13-15. FIG. 15 is a chart showing the effects of temperature and pressure on bubble formation for one combination of lubricant and refrigerant. The lubricant/refrigerant combination whose behavior is depicted in FIG. 15 is a polyolester oil, such as Frick #13 lubricant, used with hydrofluorocarbon (HFC) refrigerants, such as R-134a refrigerant. One skilled in the art will recognize that other lubricant/refrigerant combinations may be used. The chart of FIG. 15 is typical of the relationship of lubricants and refrigerants, other combinations behaving in a similar fashion. As the chart indicates, raising the pressure of the lubricant decreases the formation of bubbles as the increased pressure allows the lubricant to hold a higher concentration of refrigerant in solution. Also, reducing the temperature of the lubricant refrigerant combination also reduces the formation of bubbles. This is because as temperatures are lowered, the lubricant is able to hold a higher percentage of absorbed refrigerant in solution. In both cases, the lubricant/refrigerant mixture is subcooled below the bubble point temperature or pressure increased below bubble point pressure, which is defined herein as the temperature and pressure at which bubbles will form for a refrigerant/lubricant combination at a specific percentage of absorbed refrigerant, as long as the refrigerant remains in solution, as occurs below the bubble point temperature or above the bubble point pressure, bubble formation being suppressed. The subcooled and/or pressurized lubricant/refrigerant mixture can be supplied to the SFDs where it may undergo additional pressure drop or heating before again reaching the bubble point of the mixture, at which bubbles begin to form. Thus, to effectively provide viscous damping by SFDs in a screw compressor, it is necessary to treat the lubricant before it is supplied to the SFDs.

As discussed above, lubricant may be provided to the SFDs from the oil separator 30, allowing the SFDs to utilize the system's already available oil used for compressor operation. However, an alternative is to provide the SFDs with a dedicated lubricant supply, which requires sealing the SFDs to the maximum extent possible and recycling the lubricant in the sealed system. However, even when sealed, pressurized refrigerant gas still can infiltrate into the sealed system.

Regardless of the system used to provide lubricant to the SFDs, it is necessary to treat the lubricant. Referring now to FIG. 13, a lubricant cooler 1370 is interposed in conduit 50 before lubricant can be provided to the SFD supply port. Refrigerant in the lubricant forms bubbles as it is circulated through the system. The lubricant cooler 1370 is positioned in conduit line 50 between the source of lubricant 1372 and SFD supply port 1354. Lubricant cooler 1370 lowers the temperature of the lubricant below the bubble point temperature, to a temperature sufficient to minimize or eliminate the formation of bubbles in the lubricant prior to providing the lubricant to SFD 1304. Also depicted in FIG. 13 is a filter 1374 that filters the lubricant supplied to the SFD that removes any dirt, metal chips or other debris that may accumulate in the lubricant.

FIG. 14 is similar to FIG. 13, except that it further includes a lubricant pump 1480 that increases the pressure of the lubricant sufficiently so that bubble formation is reduced or prevented. Preferably both a lubricant cooler 1470 and a lubricant pump 1480 are provided to treat the lubricant prior to providing the lubricant to the SFDs. This provides a more effective damping fluid for viscously damping vibrations that may be induced in the rotor shafts by operation of the screw compressors.

Figure 16:
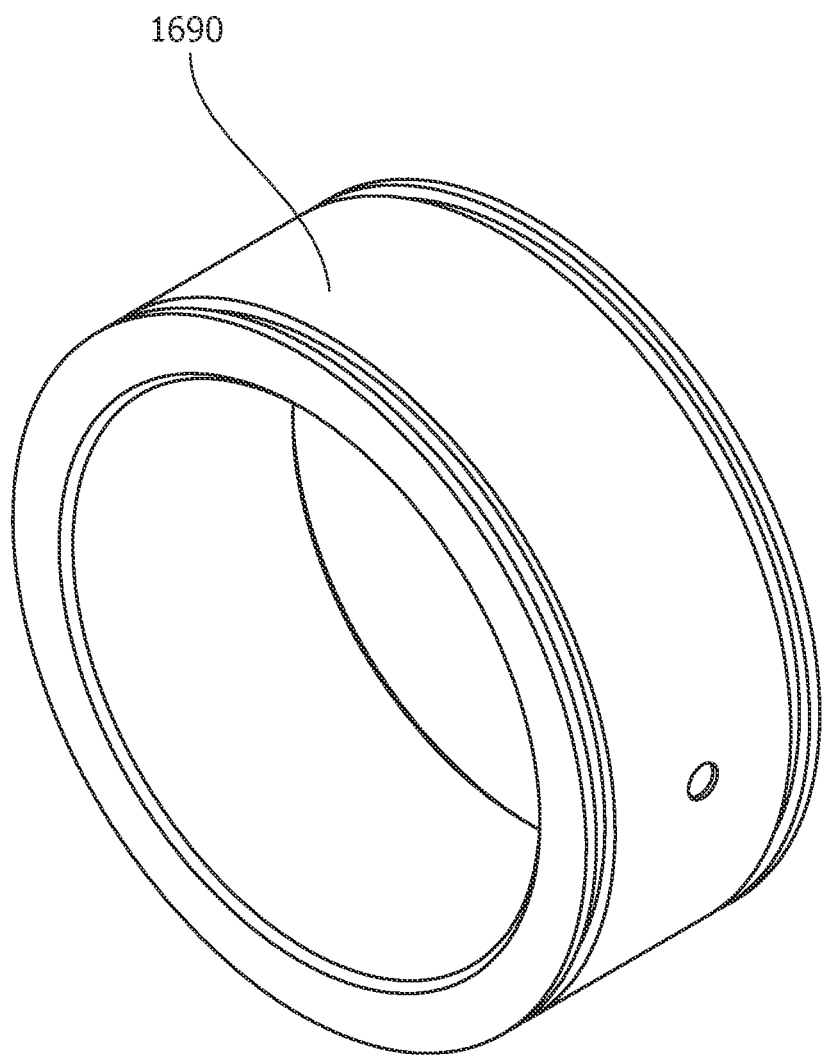
FIG. 16 illustrates a squeeze film damper where the damper bearing is a ball bearing type trust bearing.
Figure 17:
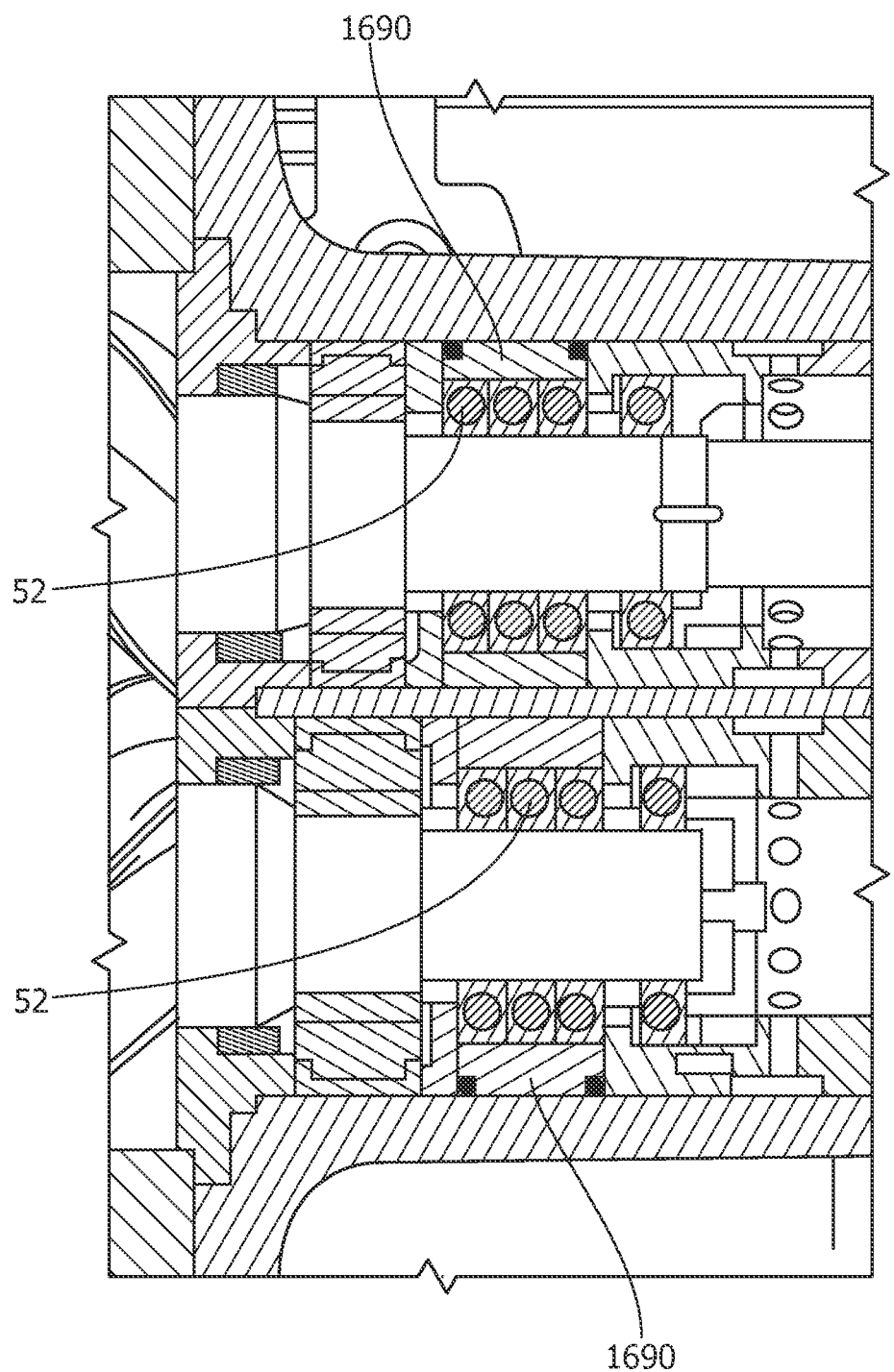
FIG. 17 illustrates a squeeze film damper installed in a screw compressor utilizing a preloaded angular contact thrust bearing as the damper bearing.

FIG. 16 illustrates a squeeze film damper 1690 that may be used in conjunction with a screw compressor to damp radial vibrations in the vicinity of the thrust bearing, the thrust bearings acting as the damper bearing to transfer shaft radial movements to the SFD. FIG. 17 depicts a rotor such as depicted in FIG. 10 additionally including squeeze film damper 1690 assembled with thrust bearings 52 for damping radial excitations at the thrust bearing.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A system for damping vibrations in a screw compressor, comprising:
   a compressor housing;
   at least one rotor further comprising a helical screw mounted in the compressor housing, the at least one rotor having a shaft with a first axial end and a second axial end;
   radial bearings positioned near each end of the shaft, the radial bearings precisely positioning the at least one rotor in the compressor housing in a radial direction within a first predetermined clearance range;
   a stationary squeeze film damper positioned in parallel to each of the radial bearings and adjacent the radial bearings, the stationary squeeze film damper having a second predetermined clearance range greater than the first predetermined clearance range of the radial bearings with the at least one rotor;

a damper bearing of the stationary squeeze film damper, wherein the damper bearing is selected from the group of bearings consisting of hydrodynamic bearings and anti-friction bearings, the damper bearing transferring radial movement of the shaft to the stationary squeeze film damper;

at least one thrust bearing mounted on the shaft of the at least one rotor, the at least one thrust bearing counteracting axial forces on the at least one rotor;

a lubricant source;

a conduit from the lubricant source to the stationary squeeze film damper providing lubricant from the lubricant source to the stationary squeeze film damper;

at least one of a cooler and a pressure pump downstream of the lubricant source and upstream of the stationary squeeze film damper with respect to a flow of the lubricant from the lubricant source to the stationary squeeze film damper, wherein the lubricant provided from the lubricant source is maintained below its bubble point;

wherein the lubricant provided to the stationary squeeze film damper provides a viscous damping of periodic radial motion of the at least one rotor, the lubricant occupying the second predetermined clearance range within the stationary squeeze film damper between the at least one rotor and a wall of the stationary squeeze film damper.

2. The system of claim 1 wherein the radial bearings are positioned between the first axial end of the shaft and the stationary squeeze film damper.

3. The system of claim 1 wherein the radial bearings are anti-friction bearings.

4. The system of claim 1 wherein the lubricant source is a screw compressor oil separator.

5. The system of claim 4 wherein the lubricant is compressor lubricant.

6. The system of claim 1 wherein the lubricant and the lubricant source are a closed system in series with the stationary squeeze film damper, the lubricant source dedicated to supplying lubricant to the stationary squeeze film damper.

7. The system of claim 1 including a plurality of stationary squeeze film dampers, the plurality of stationary squeeze film dampers located on both the first axial end and the second axial end of the at least one rotor.

8. The system of claim 1 further including a refrigerant, wherein the refrigerant is soluble in the lubricant.

9. The system of claim 8 wherein the lubricant is a polyolester oil and the refrigerant is a hydrofluorocarbon (HFC) fluid.

10. The system of claim 9 wherein the HFC refrigerant is R-134a refrigerant.

11. The system of claim 1 wherein the cooler positioned downstream of the lubricant source and upstream of the stationary squeeze film damper with respect to the flow of the lubricant from the lubricant source to the stationary squeeze film damper provides lubricant to the stationary squeeze film damper at a temperature below a bubble point temperature, at which refrigerant remains in solution in the lubricant, minimizing formation of bubbles.

12. The system of claim 1 wherein the pressure pump, positioned downstream of the lubricant source and upstream of the stationary squeeze film damper with respect to the flow of lubricant from the lubricant source to the stationary squeeze film damper, provides lubricant to the stationary squeeze film damper at a pressure above a bubble point pressure, at which refrigerant remains in solution in the lubricant, minimizing formation of bubbles.

13. The system of claim 1 including both the cooler positioned downstream of the lubricant source and upstream of the stationary squeeze film damper with respect to the flow of lubricant from the lubricant source to the stationary squeeze film damper and the pressure pump positioned downstream of the lubricant source and upstream of the stationary squeeze film damper with respect to the flow of lubricant from the lubricant source to the stationary squeeze film damper, the pressure pump and the cooler providing lubricant to the stationary squeeze film damper at a temperature below a bubble point temperature and a pressure above a bubble point pressure.

14. The system of claim 1 wherein the second predetermined clearance range of the stationary squeeze film damper is greater than the first predetermined clearance range of an adjacent radial bearing and sufficient to dampen a radial movement of the at least one rotor while preventing damage to the adjacent radial bearing.

15. The system of claim 14 wherein the second predetermined clearance range of the stationary squeeze film damper is in the range of 5%-50% greater than that of the first predetermined clearance range of the adjacent radial bearing with the at least one rotor.

16. The system of claim 1 further including a filter positioned downstream of the lubricant source and upstream of the stationary squeeze film damper with respect to the flow of lubricant from the lubricant source to the stationary squeeze film damper, the filter removing dirt, metal chips and debris in the lubricant before it is supplied to the stationary squeeze film damper.

17. The system of claim 1 wherein the stationary squeeze film damper supports no load during screw compressor operation.

18. The system of claim 1 further including a thrust bearing squeeze film damper positioned in parallel to the at least one thrust bearing to damp vibration of the shaft in the axial direction at the at least one thrust bearing.

19. A bearing system for supporting a rotor in a compressor, comprising:

an anti-friction radial bearing having a first predetermined clearance range with the rotor;

a squeeze film damper positioned in parallel to the anti-friction radial bearing along an axis of the rotor, the squeeze film damper having a second predetermined clearance with the rotor;

wherein the second predetermined clearance of the squeeze film damper with the rotor is greater than the first predetermined clearance of the anti-friction radial bearing with the rotor; and wherein the squeeze film damper further includes
a journal,
a damper bearing,
a lubricant source;
a conduit providing lubricant from the lubricant source to the journal, and wherein the lubricant forms a thin film between the journal and a housing; and at least one of a cooler and a pressure pump downstream of the lubricant source and upstream of the squeeze film damper with respect to a flow of the lubricant from the lubricant source to the squeeze film damper along the conduit, wherein the lubricant provided from the lubricant source is maintained below its bubble point.

20. The bearing system of claim 19 wherein the squeeze film damper further includes seals retaining lubricant within the journal.

* * * * *